United States Patent
Sheppard et al.

(10) Patent No.: US 9,912,424 B2
(45) Date of Patent: Mar. 6, 2018

(54) METHODS AND APPARATUS TO ESTIMATE RATINGS FOR MEDIA ASSETS USING SOCIAL MEDIA

(71) Applicant: The Nielsen Company (US), LLC, New York, NY (US)

(72) Inventors: Michael Sheppard, Brooklyn, NY (US); Alejandro Terrazas, Santa Curz, CA (US); Jonathan Sullivan, Hurricane, UT (US); Peter Lipa, Tucson, AZ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/167,460

(22) Filed: May 27, 2016

(65) Prior Publication Data

US 2017/0346582 A1    Nov. 30, 2017

(51) Int. Cl.
*H04H 60/33* (2008.01)
*H04N 21/442* (2011.01)
*G06Q 30/02* (2012.01)
*G06Q 50/00* (2012.01)

(52) U.S. Cl.
CPC ......... *H04H 60/33* (2013.01); *G06Q 30/0201* (2013.01); *H04N 21/44204* (2013.01); *H04N 21/44222* (2013.01); *G06Q 50/01* (2013.01)

(58) Field of Classification Search
CPC ............... H04H 60/33; G06Q 30/0201; H04N 21/44204; H04N 21/44222
See application file for complete search history.

(56) References Cited

U.S. PATENT DOCUMENTS

| | | | |
|---|---|---|---|
| 7,139,723 B2 | 11/2006 | Conkwright et al. | |
| 8,462,160 B2 | 6/2013 | Lindsay et al. | |
| 8,516,374 B2 * | 8/2013 | Fleischman | G06Q 30/02 715/716 |
| 8,555,327 B2 | 10/2013 | Oztaskent et al. | |
| 8,935,713 B1 | 1/2015 | Gabel et al. | |

(Continued)

OTHER PUBLICATIONS

Creegan, "Can Twitter data explain Sharknado TV appeal?" CNBC.com, Aug. 15, 2013, 6 pages, retrieved from <http://www.cnbc.com/id/100956943>.

(Continued)

*Primary Examiner* — Sumaiya A Chowdhury
(74) *Attorney, Agent, or Firm* — Hanley, Flight & Zimmerman, LLC

(57) ABSTRACT

Methods, apparatus, systems and articles of manufacture to estimate ratings for media assets using social media are disclosed. An example method includes accessing media exposure data and social media activity data corresponding to a plurality of media assets in a media bundle, the media assets included in the media bundle having audience demographics that overlap with a first media asset, determining a first credibility factor for the first media asset and average exposure for social media activity count values for respective ones of the media assets in the media bundle based on the media exposure data and the social media activity data, and applying the first credibility factor to an average exposure per social media activity count value determined for the first media asset to estimate the ratings for the first media asset.

16 Claims, 6 Drawing Sheets

200

|  | Media Asset 1 (Views / Activity) | Media Asset 2 (Views / Activity) |
|---|---|---|
| Episode 1 | - / - | 151,200 / 840 |
| Episode 2 | 84,000 / 420 | 176,400 / 924 |
| Episode 3 | 109,200 / 504 | 142,800 / 882 |
| Episode 4 | - / 630 | - / 756 |

<u>Filtered Data Table</u>

(56) References Cited

U.S. PATENT DOCUMENTS

| | | | |
|---|---|---|---|
| 8,997,132 B1 * | 3/2015 | Rowe | H04N 21/23 725/10 |
| 9,009,758 B2 | 4/2015 | Foote et al. | |
| 2010/0162312 A1 | 6/2010 | Heilbron et al. | |
| 2012/0291070 A1 | 11/2012 | Feng et al. | |
| 2013/0103637 A1 | 4/2013 | Dror et al. | |
| 2013/0311408 A1 * | 11/2013 | Bagga | G06Q 30/02 706/12 |
| 2014/0046884 A1 | 2/2014 | Erdmann et al. | |
| 2014/0222549 A1 | 8/2014 | Bruich et al. | |
| 2015/0067075 A1 | 3/2015 | Sheppard et al. | |

OTHER PUBLICATIONS

Stelter, "Nielsen to Measure Twitter Chatter About TV Shows," The New York Times, Oct. 6, 2013, 3 pages, retrieved from <http://www.nytimes.com/2013/10/07/business/media/nielsen-to-measure-twitter-chatter-about-tv.html>.

Klugman, Stuart A., "Loss Models: From Data to Decisions," book, 2004, second edition, John Wiley & Sons, Inc., Hoboken, New Jersey, pp. 514-607 (94 pages, uploaded 2 pages per sheet, 47 sheets).

Eska, Catherine, "CAS Seminar on Ratemaking," Mar. 2008, 30 pages, The Hanover Insurance Group.

\* cited by examiner

Filtered Data Table

| | Media Asset 1 (Views / Activity) | Media Asset 2 (Views / Activity) |
|---|---|---|
| Episode 1 | – / – | 151,200 / 840 |
| Episode 2 | 84,000 / 420 | 176,400 / 924 |
| Episode 3 | 109,200 / 504 | 142,800 / 882 |
| Episode 4 | – / 630 | – / 756 |

FIG. 2

METHODS AND APPARATUS TO ESTIMATE RATINGS FOR MEDIA ASSETS USING SOCIAL MEDIA

FIELD OF THE DISCLOSURE

This disclosure relates generally to audience measurement, and, more particularly, to methods and apparatus to estimate ratings for media assets using social media.

BACKGROUND

Audience measurement of media assets (e.g., such as content and/or advertisements presented by any type of medium such as television, in theater movies, radio, Internet, etc.) is typically carried out by monitoring media exposure of panelists that are statistically selected to represent particular demographic groups. Audience measurement companies, such as The Nielsen Company (US), LLC, enroll households and persons to participate in measurement panels. By enrolling in these measurement panels, households and persons agree to allow the corresponding audience measurement company to monitor their exposure to media presentations, such as media output via a television, a radio, a computer, etc. Using various statistical methods, collected media exposure data is processed to determine the size and/or demographic composition of the audience(s) for media of interest. The audience size and/or demographic information is valuable to, for example, advertisers, broadcasters, content providers, manufacturers, retailers, product developers, and/or other entities. For example, audience size and demographic information is a factor in the placement of advertisements, in valuing commercial time slots during a particular program and/or generating ratings for piece(s) of media.

BRIEF DESCRIPTION OF THE DRAWINGS

FIG. 2 is an example data table that may be used by an example central facility in the example system of FIG. 1 to estimate ratings for a media asset.

Wherever possible, the same reference numbers will be used throughout the drawing(s) and accompanying written description to refer to the same or like parts.

DETAILED DESCRIPTION

Figure 1:
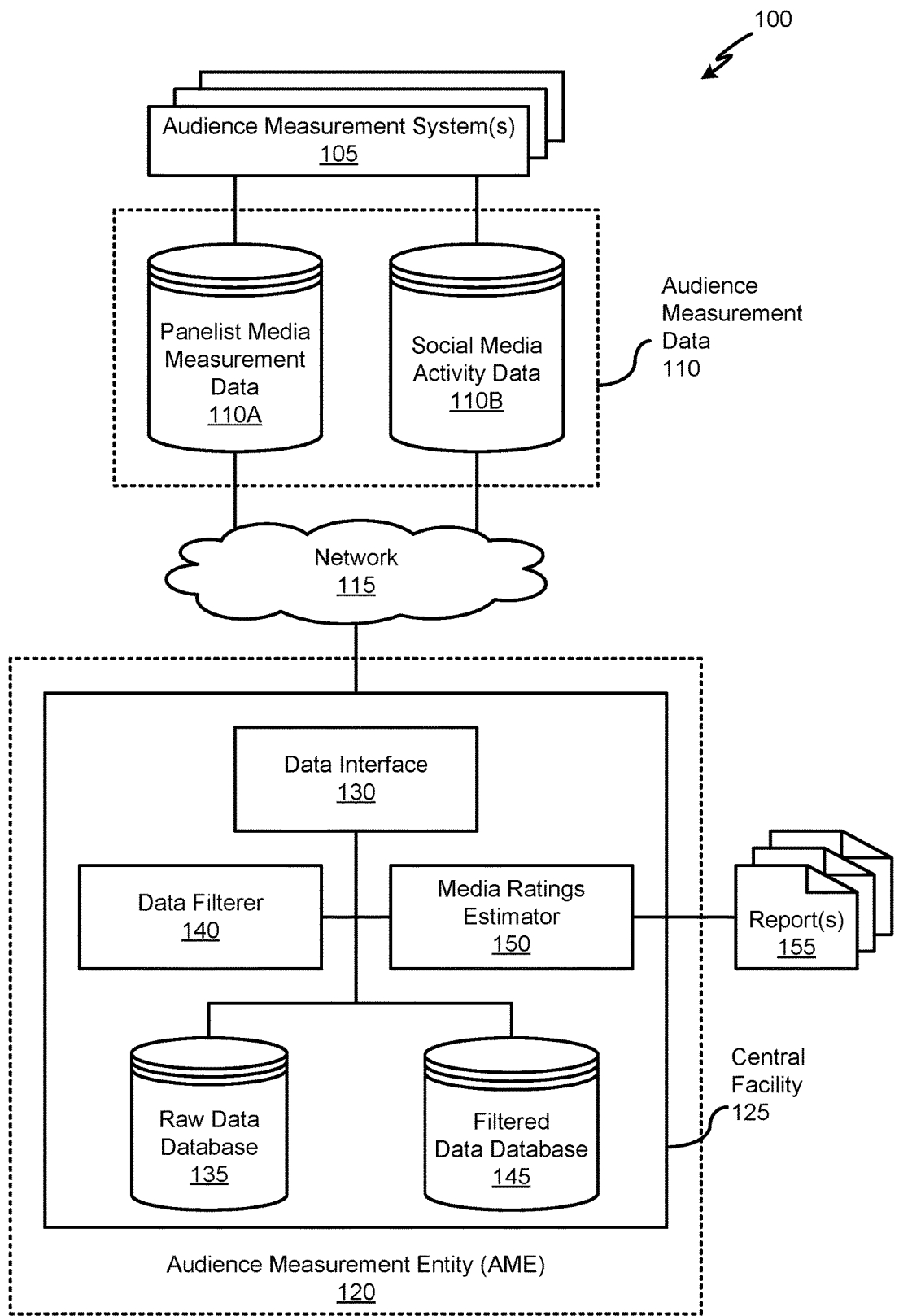
FIG. 1 illustrates an example system for audience measurement analysis implemented in accordance with the teachings of this disclosure to estimate ratings for media assets using social media.

Examples disclosed herein facilitate estimating ratings of media assets using secondary information. For example, disclosed examples incorporate historical data (e.g., "experiences") regarding viewership and social media activity to estimate viewership for media assets of interest. As used herein, social media activity includes posting social media messages, endorsing a social media message (e.g., "liking" a social media message posted by another user), etc. Based on the historical data (e.g., an amount of social media activity for past episodes of media assets and viewership for the past episodes), disclosed examples determine (1) average exposure per social media activity at an episode level, (2) variance in views per social media activity at a media asset level, (3) average exposure per social media activity across a group of media assets (e.g., an overall mean), and/or (4) variance in views per social media activity across a group of media assets, etc.

Traditionally, viewership information is estimated based on panelists and metering software. For example, an audience measurement entity may determine a number of panelists who viewed a media asset and extrapolate viewership for the media asset based on the panelist exposure numbers. While the panelists are selected to represent the general demographics of an area, the panelist exposure information may not always reflect what media is being watched. For example, in some instances, panelists (or a statistically significant number of panelists) may not watch a program. Extrapolating national viewership numbers from such "zero-rated" programs may lead to inaccurate ratings for the program.

Examples disclosed herein use auxiliary information from secondary sources to estimate ratings for media. For example, disclosed examples correlate social media activity (e.g., social media messages posted to a social media service) to viewership for past broadcasts of media to estimate viewership for a particular broadcast (e.g., a media asset of interest). In some examples, the estimated viewership may be calculated for a previously broadcast program for which viewership information is not yet known (e.g., "fast affiliate" reports or "overnight" reports that provide first national ratings for a media asset the day after telecast). In some examples, an average number of views (e.g., exposures) per social media activity is determined to estimate ratings for a future broadcast. Disclosed examples determine social media activity of interest (e.g., social media activity that indicate exposure to a media broadcast) and viewership information of past episodes of the media asset to estimate viewership per social media activity.

However, calculating a linear relationship between social media activity count and viewership of an episode of a media asset does not account for variances within the media asset. For example, calculating an average exposures per social media activity count for first media does not account for variances due to, for example, second media that broadcasts at the same time as the first media or third media that has similar characteristics as the first media. For example, when the average exposure per social media activity count increases for a first self-help program, the average exposure per social media activity count for a second self-help program may decrease (e.g., the second self-help program airs at the same time as the first self-help program), may increase (e.g., the second self-help program airs immediately after the first self-help program), or may stay the same.

To improve the accuracy in extrapolating viewership for media assets based on social media activity, disclosed examples estimate viewership using past information (sometimes referred to herein as "experiences") of two or more media assets (e.g., a media bundle). In some examples, the two or more media assets included in the media bundle have similar characteristics. For example, the media assets may both be self-help programs. In some examples, the two or more media assets may be selected based on a similar broadcast time. For example, the media assets of the media bundle may air at 3:00 PM on Monday through Friday. However, other techniques for selecting two or more media assets for processing may additionally or alternatively be used.

By processing experiences for two or more media assets, disclosed examples calculate a weighted average number of views per social media activity. Thus, disclosed examples estimate viewership by calculating (1) average exposure per social media activity count at the episode level, (2) variance of views per social media activity at the media asset level (e.g., variability within the media assets), (3) average exposure per social media activity across a group of media assets (e.g., at the media bundle level), and (4) variance of views per social media activity across a group of media assets (e.g., variability across the media bundle), etc.

FIG. 1 is a diagram of an example environment in which an example system 100 constructed in accordance with the teachings of this disclosure operates to estimate ratings for media assets using social media. The example system 100 of FIG. 1 includes one or more example audience measurement system(s) 105 and an example central facility 125 to facilitate estimating ratings for media assets using social media. In the illustrated example of FIG. 1, the central facility 125 estimates ratings for a media asset (e.g., a telecast or broadcast of, for example, an episode of the media asset) by determining an exposure predictor for the media asset. For example, the central facility 125 processes data for two or more media assets to calculate the exposure predictor. In the illustrated example, the exposure predictor represents a weighted average number of views (e.g., exposures) per social media activity. For example, the central facility 125 may determine an exposure predictor for a first media asset is 203.9 exposures per posted social media message. In such instances, if the central facility 125 identifies 1,000 social media messages related to the first media asset, the central facility 125 may estimate the total viewership for the first media as 203,900 views.

The example system 100 of FIG. 1 includes the one or more audience measurement system(s) 105 to collect example audience measurement data 110 from panelists and non-panelists. The example audience measurement system(s) 105 of FIG. 1 collect example panelist media measurement data 110A via, for example, people meters operating in statistically-selected households, set-top boxes and/or other media devices (e.g., such as digital video recorders, personal computers, tablet computers, smart-phones, etc.) capable of monitoring and returning monitored data for media presentations, etc. The example panelist media measurement data 110A of FIG. 1 includes media exposure data such as live exposure data, delayed exposure data (e.g., relative to time-shifted viewing of media via, for example, a digital video recorder and/or video on-demand), media performance data such as TV ratings (e.g., historical TV ratings and/or current TV ratings), program characteristics (e.g., attributes) such as broadcast day-of-week information, broadcast time information, originator information (e.g., a network or channel that broadcasts the media) and/or genre information, etc. In some examples, the panelist media measurement data 110A is associated with demographic information (e.g., gender, age, income, etc.) of the panelists exposed to the media.

As used herein, the term "media" includes any type of content and/or advertisement delivered via any type of distribution medium. Thus, media includes television programming or advertisements, radio programming or advertisements, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

The example audience measurement system(s) 105 of FIG. 1 also collect example social media activity data 110B related to media assets via, for example, social media servers that provide social media services to users of the social media server. As used herein, the term social media services is defined to be a service provided to users to enable users to share information (e.g., text, images, data, etc.) in a virtual community and/or network. Example social media services may include, for example, Internet forums (e.g., a message board), blogs, micro-blogs (e.g., Twitter®), social networks (e.g., Facebook®, LinkedIn, Instagram, etc.), etc. For example, the audience measurement systems 105 may monitor social media messages communicated via social media services and identify media-exposure social media messages (e.g., social media messages that reference at least one media asset (e.g., presented media, downloaded media and/or some other media event)). The example audience measurement systems 105 may filter the media-exposure social media messages for media-exposure social media messages of interest (e.g., social media messages that reference media assets of interest).

The example social media activity data 110B of FIG. 1 includes one or more of message identifying information (e.g., a message identifier, a message author, etc.), time-stamp information indicative of when a social media message was posted and/or viewed, the content of the social media message and/or an identifier of the media asset referenced in the media-exposure social media message. In some examples, the audience measurement systems 105 may process the media-exposure social media messages of interest and aggregate information related to the social media messages. For example, the audience measurement systems 105 may determine a count of the media-exposure social media messages of interest, may determine a number of unique authors who posted the media-exposure social media messages of interest and/or may determine a number of impressions of (e.g., exposure to) the media-exposure social media messages of interest, etc.

In the illustrated example of FIG. 1, the audience measurement system(s) 105 send the audience measurement data 110 to the central facility 125 via an example network 115. The example network 115 of the illustrated example of FIG.

1 is the Internet. However, the example network 115 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 115 enables the central facility 125 to be in communication with the audience measurement systems 105. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

In the illustrated example, the central facility 125 is operated by an audience measurement entity (AME) 120. The example AME 120 of the illustrated example of FIG. 1 is an entity, such as The Nielsen Company (US), LLC, that monitors and/or reports exposure to media assets and operates as a neutral third party. That is, in the illustrated example, the audience measurement entity 120 does not provide media (e.g., content and/or advertisements) to end users. This un-involvement with media production and/or delivery ensures the neutral status of the audience measurement entity 120 and, thus, enhances the trusted nature of the data the AME 120 collects and processes. The reports generated by the audience measurement entity (sometimes referred to as an "audience analytics entity" (AAE)) may identify aspects of media usage such as the number of people who are watching television programs and characteristics of the audiences (e.g., demographic information of who is watching the television programs, when they are watching the television programs, etc.).

The example AME 120 of FIG. 1 operates the central facility 125 to estimate ratings for a media asset of interest using social media. As used herein, a media asset of interest is a particular media program (e.g., identified via an episode number and season number) that is being analyzed (e.g., for a report). For example, a first media asset of interest may be episode 3 of season 2 of a program "Sports Stuff" and a second media asset of interest may be episode 4 of season 2 of the program "Sports Stuff" The central facility 125 of the illustrated example includes a server and/or database that collects and/or receives audience measurement data related to media assets (e.g., media and/or media events) and estimates viewership of the media asset based on past "experiences" (e.g., viewership information for previous media events and social media activity associated with the previous media events and the media asset of interest).

In some examples, the central facility 125 is implemented using multiple devices and/or the audience measurement systems 105 are implemented using multiple devices. For example, the central facility 125 and/or the audience measurement systems 105 may include disk arrays and/or multiple workstations (e.g., desktop computers, workstation servers, laptops, etc.) in communication with one another. In the illustrated example, the central facility 125 is in communication with the audience measurement systems 105 via one or more wired and/or wireless networks represented by the network 115.

The example central facility 125 of the illustrated example of FIG. 1 processes the audience measurement data 110 returned by the audience measurement systems 105 to estimate ratings for media assets. For example, the central facility 125 estimates ratings for media by determining an "exposure predictor" for media of interest. In the illustrated example, the central facility 125 processes data (e.g., viewership information and social media activity) for two or more media assets and calculates the exposure predictor for each media asset. In the illustrated example, the exposure predictor represents a weighted average number of views (e.g., exposures) per social media activity.

In the illustrated example of FIG. 1, the central facility 125 includes an example data interface 130, an example raw data database 135, an example data falterer 140, an example filtered data database 145 and an example media ratings estimator 150. In the illustrated example of FIG. 1, the example central facility 125 includes the example data interface 130 to provide an interface between the network 115 of FIG. 1 and the central facility 125. For example, the data interface 130 may be a wired network interface, a wireless network interface, a Bluetooth® network interface, etc. and may include the associated software and/or libraries needed to facilitate communication between the network 115 and the central facility 125. In the illustrated example of FIG. 1, the data interface 130 receives the audience measurement data 110 returned by the example audience measurement systems 105. The example data interface 130 records the audience measurement data 110 in the example raw data database 135.

In the illustrated example of FIG. 1, the example central facility 125 includes the example raw data database 135 to record data (e.g., the example audience measurement data 110) provided by the audience measurement systems 105 via the example data interface 130. The example raw data database 135 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example raw data database 135 may additionally or alternatively be implemented by one or more double data rate (DDR) memories, such as DDR, DDR2, DDR3, mobile DDR (mDDR), etc. The example raw data database 135 may additionally or alternatively be implemented by one or more mass storage devices such as hard disk drive(s), compact disk drive(s), digital versatile disk drive(s), etc. While in the illustrated example the raw data database 135 is illustrated as a single database, the raw data database 135 may be implemented by any number and/or type(s) of databases.

The example central facility 125 of the illustrated example of FIG. 1 combines multiple disparate data sets to enable modeling and assessment of multiple inputs simultaneously. As described below, at least some of the variables are translated (e.g., modified and/or manipulated) from their raw form to be more meaningfully handled when estimating the ratings for a media asset. For example, raw data may be multiplied, aggregated, averaged, etc., and stored as translated data (sometimes referred to herein as "sanitized," "normalized" or "recoded" data) prior to estimating the viewership information.

In the illustrated example of FIG. 1, the example data filterer 140 translates the audience measurement data 110 received from the example audience measurement systems 105 into a form more meaningfully handled by the example media ratings estimator 150. For example, the data filterer 140 may retrieve and/or query the audience measurement data 110 recorded in the example raw data database 135 and normalize the disparate data to a common scale. In some examples, the example data filterer 140 modifies and/or manipulates audience measurement data 110 based on the type of data.

The example data filterer 140 parses the translated data and generates data tables identifying viewership and social media activity for media assets. For example, the data filterer 140 may parse the raw data database 135 and aggregate viewership information for past telecasts of media. The example data filterer 140 may also aggregate social media activity for the past telecasts of media. In the illustrated example of FIG. 1, the data filterer 140 stores the generated data tables in the filtered data database 145.

In the illustrated example of FIG. 1, the example central facility 125 includes the example filtered data database 145 to record filtered data provided by the example data filterer 140. Example data table 200 of the illustrated example of FIG. 2 illustrates an example data table that may be recorded in the example filtered data database 145. The example filtered data database 145 may be implemented by a volatile memory (e.g., an SDRAM, DRAM, RDRAM, etc.) and/or a non-volatile memory (e.g., flash memory). The example filtered data database 145 may additionally or alternatively be implemented by one or more DDR memories, such as DDR, DDR2, DDR3, mDDR, etc. The example filtered data database 145 may additionally or alternatively be implemented by one or more mass storage devices such as hard disk drive(s), compact disk drive(s), digital versatile disk drive(s), etc. While in the illustrated example the filtered data database 145 is illustrated as a single database, the filtered data database 145 may be implemented by any number and/or type(s) of databases.

In the illustrated example of FIG. 1, the central facility 125 includes the example media ratings estimator 150 to use the filtered data tables generated by the example data filterer 145 to estimate ratings for a media asset of interest. For example, the media ratings estimator 150 may estimate viewership of the media asset of interest based on historical social media activity and viewership information (e.g., "experiences") associated with the media asset of interest.

In the illustrated example, the media ratings estimator 150 uses program attributes information of the media asset of interest to select a group of media assets to include in a media bundle. As used herein, program attributes information includes one or more of genre information of the media asset of interest, day-of-week information related to the media asset of interest, broadcast time related to the media asset of interest, originator (e.g., network or channel) information related to the media asset of interest, etc. In general, the media assets included in a given media bundle are associated with a similar audience (e.g., have overlapping audience demographics). For example, the media assets included in a given media bundle may be of the same genre (e.g., are self-help programs), may have been broadcast at the same time (e.g., Monday-Friday at 3 PM), etc.

In the illustrated example of FIG. 1, in response to identifying the media assets to include in the media bundle, the example media ratings estimator 150 retrieves data related to the media bundle from the filtered data database 145. The example media ratings estimator 150 of FIG. 1 processes the historical data (e.g., "experiences") associated with the media assets in the media bundle and calculates an exposure predictor for each media asset included in the media bundle. As discussed below in connection with FIG. 3, the exposure predictor represents a weighted average number of views per social media activity for reach respective media asset. To improve the accuracy in the determined exposure predictor, the example media ratings estimator 150 uses the experiences from all the media assets in the media bundle, rather than only those experiences related to each respective media asset, to determine the exposure predictor.

Thus, rather than calculating a ratio of the number of views per social media activity based on just one media asset and/or experiences related to the one media asset, the media ratings estimator 150 of FIG. 1 combines the experiences of the media bundle with the experiences of individual media assets to calculate a weighted average number of views per social media activity for each media asset (e.g., the exposure predictor). For example, and as discussed in connection with FIG. 3, the media ratings estimator 150 may apply Equation 1 to the experiences of a media bundle to determine a weighted average for a given media asset.

$$C_i = \hat{Z}_i * \overline{X}_i + (1-\hat{Z}_i) * \hat{\mu}$$  Equation 1:

In Equation 1 above, the exposure predictor for the $i^{th}$ media asset ($C_i$) is calculated using a credibility factor for the $i^{th}$ media asset ($\hat{Z}_i$), an estimated average based on the past experiences of the $i^{th}$ media asset ($\overline{X}_i$) and an unbiased estimator of the overall average number of views per social media activity of the media bundle ($\hat{\mu}$). Examples for calculating the variables credibility factor ($\hat{Z}_i$), the estimated average ($\overline{X}_i$) and the overall average ($\hat{\mu}$) are disclosed in further detail below in connection with FIG. 3. Equation 1 illustrates that as the credibility factor ($\hat{Z}_i$) for a media asset increases (e.g., approaches one), the exposure predictor ($C_i$) is closer to the average number of views per social media activity count of the particular media asset ($\overline{X}_i$). In contrast, when the credibility factor ($\hat{Z}_i$) for a media asset decreases (e.g., approaches zero), the exposure predictor ($C_i$) is closer to the unbiased estimator of the overall average number of views per social media activity count ($\hat{\mu}$) for the entire media bundle.

The example media ratings estimator 150 of the illustrated example of FIG. 1 applies the exposure predictor ($C_i$) and the social media activity associated with the media asset of interest to generate reports 155 estimating the viewership for the media asset(s) of interest. For example, and as discussed in connection with FIG. 3, the media ratings estimator 150 may use Equation 2 to estimate viewership for the media asset of interest.

$$\text{Views}_{i,j} = C_i * m_{i,j}$$  Equation 2:

In Equation 2 above, the media ratings estimator 150 uses the exposure predictor for the $i^{th}$ media asset ($C_i$) and the amount of social media activity for the $j^{th}$ episode of the $i^{th}$ media asset ($m_{i,j}$) to determine the viewership for the $j^{th}$ episode of the $i^{th}$ media asset ($\text{Views}_{i,j}$). The media ratings estimator 150 may then provide the reports 155 including the viewership information for the media asset of interest to a requesting party (e.g., a media provider).

FIG. 2 is an example data table 200 that the example data falterer 140 of FIG. 1 may store in the example filtered data database 145 of FIG. 1. In the illustrated example of FIG. 2, the data table 200 includes filtered data associated with a first media asset 205 and a second media asset 210. In the illustrated example of FIG. 2, the media asset columns 205, 210 indicate viewership for the respective episode of the media asset per count of social media activity. Historical data for the first media asset 205 is available for two episodes 255, 260 and historical data for the second media asset 210 is available for three episodes 250, 255, 260.

The example data table 200 of the illustrated example of FIG. 2 includes four example rows 250, 255, 260, 265 associated with four episodes of each media asset 205, 210. The first example row 250 indicates that no historical data is available for the first episode of the first media asset 205. The first example row 250 also indicates that 151,200 views were associated with the first episode of the second media asset 210 and that social media activity was counted 840 times with respect to the first episode of the second media asset 210.

The second example row 255 indicates that 84,000 views were associated with the second episode of the first media asset 205 and that social media activity was counted 420 times with respect to the second episode of the first media asset 205. The second example row 255 also indicates that 176,400 views were associated with the second episode of the second media asset 210 and that social media activity was counted 924 times with respect to the second episode of the second media asset 210.

The third example row 260 indicates that 109,200 views were associated with the third episode of the first media asset 205 and that social media activity was counted 504 times with respect to the third episode of the first media asset 205. The third example row 260 also indicates that 142,800 views were associated with the third episode of the second media asset 210 and that social media activity was counted 882 times with respect to the third episode of the second media asset 210.

The fourth example row 265 indicates that social media activity was counted 630 times with respect to the fourth episode of the first media asset 205, but viewership information related to the fourth episode of the first media asset 205 is unavailable. The fourth example row 265 also indicates that social media activity was counted 756 times with respect to the fourth episode of the second media asset 210, but viewership information related to the fourth episode of the second media asset 210 is unavailable. As discussed below in connection with FIG. 3, the media ratings estimator 150 may use the social activity counts for the fourth episode of the first media asset 205 and the second media asset 210 to estimate viewership information for the fourth episodes of the respective media assets 205, 210.

While two example media assets and four example episodes are represented in the example data table 200 of FIG. 2, more or fewer media assets and/or episodes may be represented in the example data table 200 corresponding to the many media assets/episode combinations that be collected and/or provided by the audience measurement system(s) 105 of FIG. 1.

Figure 3:
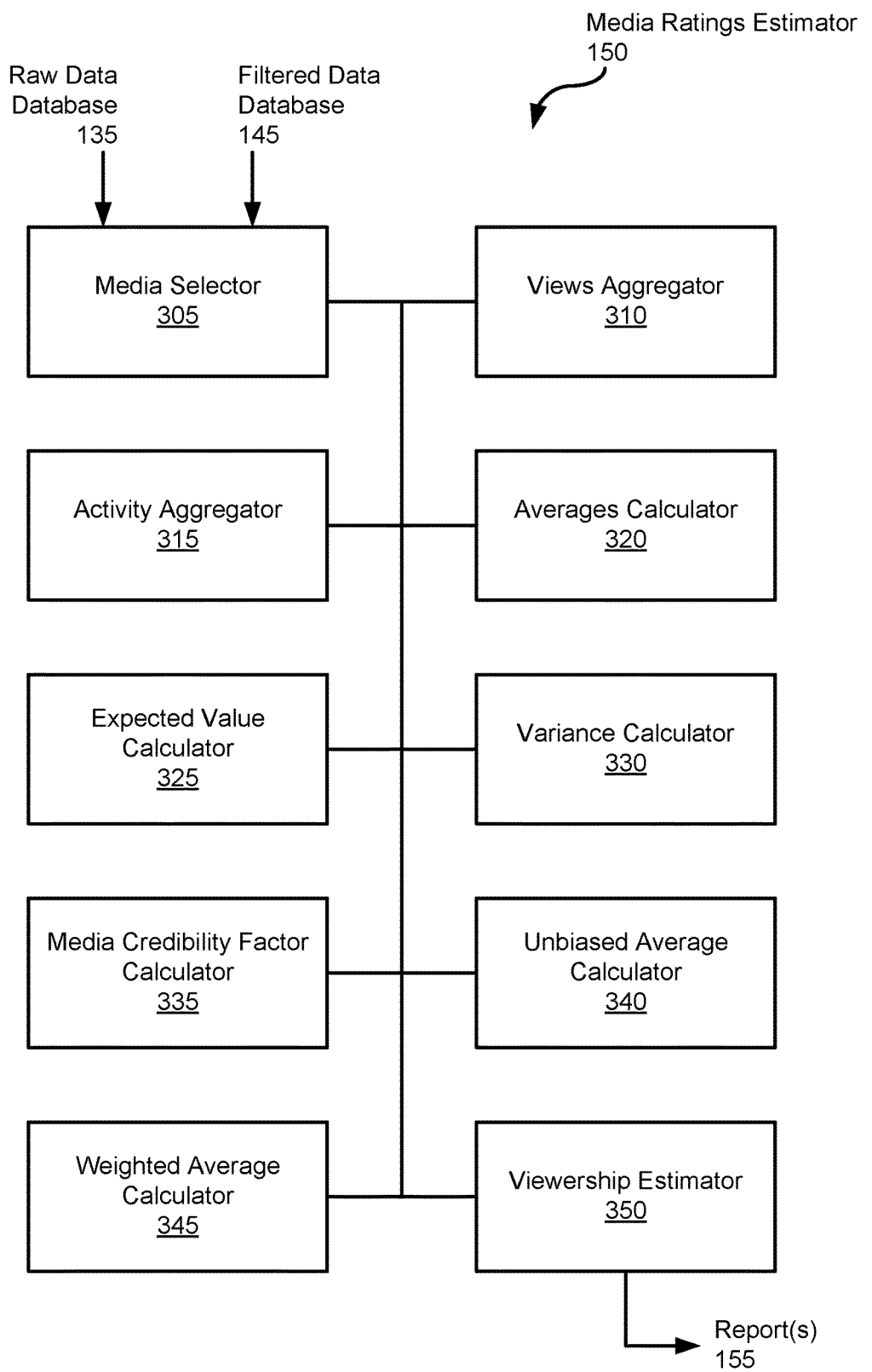
FIG. 3 is an example block diagram of an example implementation of a media ratings estimator included in the example system of FIG. 1.

FIG. 3 is a block diagram of an example implementation of the media ratings estimator 150 of FIG. 1 that may facilitate estimating viewership of media assets using social media activity. In the illustrated example of FIG. 3, the media ratings estimator 150 applies non-parametric estimation techniques to estimate the viewership for a media asset of interest. For example, the problems solved by the media ratings estimator 150 are model-free (e.g., independent of a model) and it is assumed that there is no known distribution of values. However, if the data follows a known distribution model (e.g., a binomial distribution, etc.), the example media ratings estimator 150 may apply parametric and/or semi-parametric estimation techniques to estimate the viewership for a media asset of interest. The example media ratings estimator 150 of FIG. 3 includes an example media selector 305, an example views aggregator 310, an example activity aggregator 315, an example averages calculator 320, an example expected value calculator 325, an example variance calculator 330, an example media credibility factor calculator 335, an example unbiased average calculator 340, an example weighted average calculator 345 and an example viewership estimator 350.

In the illustrated example of FIG. 3, the media ratings estimator 150 includes the example media selector 305 to select media assets to include in a media bundle. In the illustrated example, the media selector 305 uses program attributes information of media assets to select a media bundle. For example, the media selector 305 may identify a media asset of interest, for example, from the raw data database 135 and/or the filtered data database 145 and select one or more media assets to include in a bundle that are associate with similar audiences (e.g., that have similar audience demographics) as the media asset of interest. In some examples, the media selector 305 selects media assets to include in the media bundle based on genre information (e.g., have a common genre), based on broadcast time related to the media asset of interest, originator (e.g., network or channel) information related to the media asset of interest, etc. In the example of FIG. 3, the media selector 304 includes the first media asset 205 and the second media asset 210 of FIG. 2 in the same media bundle. In the illustrated example, the media bundle has a size (r) of 2, and the number of experiences for the first media asset 205 ($n$) is 2 and for the second media asset 210 ($n$) is 3. As used herein, the term "experiences" is defined as the number of historical instances of the media asset for which viewership and social media activity data is available.

In the illustrated example of FIG. 3, the media ratings estimator 150 includes the example views aggregator 310 to aggregate viewership information for media included in the media bundle based on different metrics. For example, the views aggregator 310 may aggregate the number of views per episode of each media asset ($Views_{i,j}$), where the views ($Views_{i,j}$) represents the viewership information for the $j^{th}$ episode of the $i^{th}$ media asset. In some examples, the example views aggregator 310 may aggregate the number of views per media asset ($Views_i$), where the aggregated views ($Views_i$) represents the total number of views for the $i^{th}$ media asset. For example, with reference to the example data table 200 of FIG. 2, the aggregated views for the first media asset 205 ($Views_1$) is 193,200 views, and the aggregated views for the second media asset 210 ($Views_2$) is 470,400 views. In some examples, the example views aggregator 310 may aggregate the total number of views of the media assets included in the media bundle (e.g., $Views_{All}=Views_1+Views_2$). Referring to the example data table 200 of FIG. 2, the total number of views of the media assets included in the media bundle is 663,600 views.

In the illustrated example of FIG. 3, the media ratings estimator 150 includes the example activity aggregator 315 to aggregate social media activity information for media included in the media bundle based on different metrics. For example, the activity aggregator 315 may aggregate the count of social media activity per episode of each media asset ($m_{i,j}$), where the activity count ($m_{i,j}$) represents the social media activity counted for the $j^{th}$ episode of the $i^{th}$ media asset. In some examples, the example activity aggregator 315 may aggregate the social media activity count per media asset ($m_i$), where the aggregated media activity count ($m_i$) represents the total number of social media activities counted with respect to the $i^{th}$ media asset. For example, with reference to the example data table 200 of FIG. 2, the aggregated activity count for the first media asset 205 ($m_1$) is 924, and the aggregated activity count for the second media asset 210 ($m_2$) is 2,646. In some examples, the example activity aggregator 315 aggregates the total social media activity counts of the media assets included in the media bundle (e.g., $m=m_1+m_2$). Referring to the example data table 200 of FIG. 2, the total activity count for the media assets included in the media bundle is 3,570.

In some examples, the activity aggregator 315 processes only those experiences for which viewership information and social media activity counts are available. For example, when aggregating activity counts for the first media asset 205, the example activity aggregator 315 references the second episode 255 and the third episode 260, but not the fourth episode 265 because viewership information is not available for that episode. Similarly, when aggregating activity counts for the second media asset 210, the example activity aggregator 315 references the first episode 250, the second episode 255 and the third episode 260, but not the fourth episode 265 viewership because viewership information is not available for that episode.

In the illustrated example of FIG. 3, the media ratings estimator 150 includes the example averages calculator 320 to calculate average number of views per social media activity at the episode level ($X_{i,j}$), the media asset level ($\overline{X}_i$) and/or the media bundle level ($\overline{\overline{X}}$). For example, the averages calculator 320 may use Equation 3 to calculate the average number of views per social media activity at the episode level.

$$X_{i,j} = \frac{Views_{i,j}}{m_{i,j}} \qquad \text{Equation 3}$$

In Equation 3 above, the average number of views per social media activity of the $j^{th}$ episode of the $i^{th}$ media asset ($\overline{X}_{i,j}$) is determined as a ratio of the viewership information of the $j^{th}$ episode of the $i^{th}$ media asset ($Views_{i,j}$) and the social media activity count of the $j^{th}$ episode of the $i^{th}$ media asset ($m_{i,j}$). The average number of views per social media activity of the five complete experiences of the example data table 200 of FIG. 2 are illustrated in Table 1.

TABLE 1

|  | Media Asset 1 (Average number of views per social media activity) | Media Asset 2 (Average number of views per social media activity) |
|---|---|---|
| Episode 1 | — | $X_{2,1} = \frac{151{,}200}{840} = 180$ |
| Episode 2 | $X_{1,2} = \frac{84{,}000}{420} = 200$ | $X_{2,2} = \frac{176{,}400}{924} = 190.9$ |
| Episode 3 | $X_{1,3} = \frac{109{,}200}{504} = 216.7$ | $X_{2,3} = \frac{142{,}800}{882} = 161.9$ |

To calculate the average number of views per social media activity at the media asset level, the averages calculator 320 uses Equation 4.

$$\overline{X}_i = \frac{Views_i}{m_i} \qquad \text{Equation 4}$$

In Equation 4 above, the average number of views per social media activity of the $i^{th}$ media asset ($\overline{X}_i$) is determined as a ratio of the viewership information of the $i^{th}$ media asset ($Views_i$) and the social media activity count of the $i^{th}$ media asset ($m_i$). By applying Equation 4 to the information provided in the example data table 200 of FIG. 2, the averages calculator 320 determines the average number of views per social media activity of the first media asset 205 ($\overline{X}_1$) is 209.1 (e.g., (84,000+109,200)/(420+504)=209.1), and the average number of views per social media activity of the second media asset 210 ($\overline{X}_2$) is 177.8 (e.g., (151,200+176,400+142,800)/(840+924+882)=177.8).

To calculate the average number of views per social media activity at the media bundle level, the averages calculator 320 uses Equation 5.

$$\overline{\overline{X}} = \frac{Views}{m} \qquad \text{Equation 5}$$

In Equation 4 above, the average number of views per social media activity at the media bundle level ($\overline{\overline{X}}$) is determined as a ratio of the total viewership information media assets included in the media bundle (Views) and the total social media activity count of the media assets in the media bundle (m). By applying Equation 5 to the information provided in the example data table 200 of FIG. 2, the averages calculator 320 determines an overall average number of views per social media activity of the media bundle ($\overline{\overline{X}}$) is 185.9 (e.g., (84,000+109,200+151,200+176,400+142,800)/(420+504+840+924+882)=185.9).

In the illustrated example of FIG. 3, the media ratings estimator 150 includes the example expected value calculator 325 to calculate an unbiased estimate of an expected value of the process variance ($\hat{v}$). The unbiased estimate of an expected value of the process variance ($\hat{v}$) represents variability in the average values of the media assets at the episode level (e.g., the average of the variance for each media asset), for example, due to randomness in the estimation process, such as randomness in estimating the viewership and/or social media activity in the examples disclosed herein. In the illustrated example of FIG. 3, the expected value calculator 325 uses Equation 6 to calculate the unbiased estimate of an expected value of the process variance ($\hat{v}$).

$$\hat{v} = \frac{\sum_{i=1}^{r} \sum_{j=1}^{n_i} m_{i,j} * (X_{i,j} - \overline{X}_i)^2}{\sum_{i=1}^{r} (n_i - 1)} \qquad \text{Equation 6}$$

In Equation 6 above, the variable ($\hat{v}$) represents the unbiased estimate of an expected value of the process variance and the variable (r) represents the number of media assets included in the media bundle (e.g., 2). The variable ($n_i$) represents the number of experiences associated with the media asset (e.g., wherein an experience corresponds to an instance (e.g., episode) of the media asset for which both viewership information and social media activity information is available). For example, the number of experiences for the first media asset 205 ($n_1$) is 2 and the number of experiences for the second media asset 210 ($n_2$) is 3. The variable ($m_{i,j}$) represents the social media activity count of the $j^{th}$ episode of the $i^{th}$ media asset. The variable ($X_{i,j}$) represents the social media activity count of the $j^{th}$ episode of the $i^{th}$ media asset (e.g., at the episode level) and the variable ($\overline{X}_i$) represents the average number of views per social media activity count at the media asset level. By solving for Equation 6, the example expected value calculator 325 calculates the unbiased estimate of an expected value of the process variance ($\hat{v}$) is 149,777.8 for the example of FIG. 2.

In the illustrated example of FIG. 3, the media ratings estimator 150 includes the example variance calculator 330 to calculate an unbiased estimate of a variance of the hypothetical mean (â). The unbiased estimate of the variance of the hypothetical mean (â) represents variability in the average values across the media assets (e.g., the homogeneity of the average values within a given media bundle). In some examples, the unbiased estimate of a variance of the hypothetical mean (â) may be representative of attributes (e.g., advertising) provided to boost the average number of views per social media activity count. In the illustrated example of FIG. 3, the variance calculator 330 uses Equation 7 to calculate the unbiased estimate of a variance of the hypothetical mean (â).

$$\hat{a} = \frac{\sum_{i=1}^{r} m_i * (\overline{X}_i - \overline{X})^2 - \hat{v} * (r-1)}{m - \frac{1}{m}\sum_{i=1}^{r} m_i^2}$$ Equation 7

In Equation 7 above, the variable (â) represents the unbiased estimate of a variance of the hypothetical mean, the variable (v̂) represents the unbiased estimate of an expected value of the process variance calculated using Equation 6 above, and the variable (r) represents the number of media assets included in the media bundle (e.g., 2). The variable ($m_i$) represents the social media activity count associated with the respective media asset and the variable (m) represents the total social media activity count of the media assets in the media bundle. For example, the social media activity count for the first media asset 205 ($m_1$) is 924 and the social media activity count for the second media asset 210 ($m_2$) is 2,646. The variable ($\overline{X}_i$) represents the average number of views per social media activity count at the media asset level (e.g., $\overline{X}_1$=209.1 and $\overline{X}_2$=177.8) and the variable ($\overline{X}$) represents the average number of views per social media activity count at the media bundle level (e.g., $\overline{X}$=185.9). By solving for Equation 7, the example variance calculator 330 calculates the unbiased estimate of a variance of the hypothetical mean (â) is 380.9 for the example of FIG. 2.

In the illustrated example of FIG. 3, the media ratings estimator 150 includes the example media credibility factor calculator 335 to calculate a credibility factor (Ẑ) for each media asset. In the illustrated example, the credibility factor (Ẑ) is a value between zero and one and represents the statistical weight to apply to the average number of views per social media activity count at the media asset level versus at the media bundle level. In the illustrated example of FIG. 3, the example media credibility factor 335 uses Equation 8 to determine the credibility factor (Ẑ) for each media asset of the media bundle.

$$\hat{Z}_i = \frac{m_i}{m_i + \hat{v}/\hat{a}}$$ Equation 8

In Equation 8 above, the variable (â) represents the unbiased estimate of a variance of the hypothetical mean calculated using Equation 7 above, the variable (v̂) represents the unbiased estimate of an expected value of the process variance calculated using Equation 6 above, and the variable ($m_i$) represents the social media activity count associated with the respective media asset. For example, the social media activity count for the first media asset 205 ($m_1$) is 924 and the social media activity count for the second media asset 210 ($m_2$) is 2,646.

Solving for the credibility factor (Ẑ) for each media asset using Equation 8, for the example of FIG. 2, the media credibility factor calculator 335 determines the credibility factor of the first media asset 205 ($\hat{Z}_1$) is 70.1 percent, and the credibility factor of the second media asset 210 ($\hat{Z}_2$) is 87.1 percent. With respect to Equation 8 above, example techniques for increasing the credibility factor (Ẑ) for a media asset include (1) increasing the social media activity count associated with the respective media asset and/or (2) minimizing the value of the ratio of (1) the unbiased estimate of an expected value of the process variance (v̂) and (2) the unbiased estimate of a variance of the hypothetical mean (â). Example techniques for minimizing the value of the ratio (1) the unbiased estimate of an expected value of the process variance (v̂) and (2) the unbiased estimate of a variance of the hypothetical mean (â) (sometimes referred to as the "Bühlmann credibility factor (K)") include decreasing the unbiased estimate of an expected value of the process variance (v̂) and/or increasing the unbiased estimate of a variance of the hypothetical mean (â). A larger Bühlmann credibility factor (K) gives less credibility to the media asset (e.g., decreases the credibility factor (Ẑ) for the particular media asset) and a smaller Bühlmann credibility factor (K) improves credibility of the media asset (e.g., increases the credibility factor (Ẑ) for the particular media asset).

In some examples, if the variance calculator 330 calculates the unbiased estimate of a variance of the hypothetical mean (â) to be a negative number, the variance calculator 330 sets the value of the unbiased estimate of a variance of the hypothetical mean (â) to be zero. In some such instances, the credibility factor (Ẑ) for the particular media asset is determined to be zero.

In the illustrated example of FIG. 3, the media ratings estimator 150 includes the example unbiased average calculator 340 to calculate an unbiased estimator of an overall average (μ̂). In the illustrated example, the unbiased estimator of the overall average (μ̂) represents an overall average number of views per social media activity count based on the average number of views per social media activity count at the media asset level and the credibility factor (Ẑ) for each media asset. The example unbiased average calculator 340 of FIG. 3 calculates the unbiased estimator of the overall average (μ̂) using Equation 9.

$$\hat{\mu} = \frac{\sum_{i=1}^{r} \hat{Z}_i * \overline{X}_i}{\sum_{i=1}^{r} \hat{Z}_i}$$ Equation 9

In Equation 9 above, the variable (μ̂) represents the unbiased estimator of the overall average, the variable ($\hat{Z}_i$) represents the credibility factor of each media asset and is calculated by the media credibility factor calculator 335 using Equation 8 above, the variable ($\overline{X}_i$) represents the average number of views per social media activity count at the media asset level and is calculated by the averages calculator 320 using Equation 4 above, and the variable (r) represents the number of media assets included in the media bundle (e.g., 2 media assets). Solving for the unbiased estimator of the overall average (μ̂) using Equation 9, the unbiased average calculator 340 calculates the unbiased estimator of the overall average (μ̂) is 191.7.

In the illustrated example of FIG. 3, the media ratings estimator 150 includes the example weighted average calculator 345 to calculate the exposure predictor (e.g., the weighted average number of views per social media activity count at the media asset level) ($C_i$) based on the total experiences of the media assets in the media bundle. The exposure predictor ($C_i$) represents a weighted combination of the average number of views per social media activity count at the media asset level ($\overline{X}_i$) and the unbiased estimator of the overall average number of views per social media activity count ($\hat{\mu}$), with the weights based on the credibility factor ($\hat{Z}_i$). The example weighted average calculator 345 applies the credibility factor ($\hat{Z}_i$) to the average number of views per social media activity count at the media asset level ($\overline{X}_i$) and the unbiased estimator of the overall average number of views per social media activity count ($\hat{\mu}$) to calculate the exposure predictor ($C_i$). For example, the weighted average calculator 345 of FIG. 3 uses Equation 1 described above (and reproduced here for convenience) to calculate the exposure predictor ($C_i$).

$$C_i = \hat{Z}_i * \overline{X}_i + (1-\hat{Z}_i) * \hat{\mu} \qquad \text{Equation 1:}$$

In Equation 1 above, the variable ($\hat{Z}_i$) represents the credibility factor of a media asset and is calculated by the media credibility factor calculator 335 using Equation 8 above, the variable ($\overline{X}_i$) represents the average number of views per social media activity count of the media asset and is calculated by the averages calculator 320 using Equation 4 above, and the variable ($\hat{\mu}$) represents the unbiased estimator of the overall average number of views per social media activity count over all media assets in the media bundle, and is calculated by the unbiased average calculator 340 using Equation 9 above. Equation 1 illustrates that as the credibility factor ($\hat{Z}_i$) for a media asset increases (e.g., approaches one), the exposure predictor ($C_i$) is closer to the average number of views per social media activity count of the particular media asset ($\overline{X}_i$). In contrast, when the credibility factor ($\hat{Z}_i$) for a media asset decreases (e.g., approaches zero), the exposure predictor ($C_i$) is closer to the unbiased estimator of the overall average number of views per social media activity count ($\hat{\mu}$) for the entire media bundle. Solving for the exposure predictor ($C_i$) for each media asset using Equation 1 and the example of FIG. 2, the weighted average calculator 345 determines the exposure predictor of the first media asset 205 ($C_1$) is 203.9 (e.g., the weighted average number of views per social media activity count of the first media asset 205), and the exposure predictor of the second media asset 210 ($C_2$) is 179.6 (e.g., the weighted average number of views per social media activity count of the second media asset 210).

In the illustrated example of FIG. 3, the media ratings estimator 150 includes the example viewership estimator 350 to estimate viewership for a media asset. The example viewership estimator 350 estimates the viewership for the media asset based on the exposure predictor at the media asset level ($C_i$) and the social media activity count for the respective episode ($m_{i,j}$). In the illustrated example of FIG. 3, the viewership estimator 350 predicts the viewership for a media asset of interest (e.g., episode 4 of the first media asset 205 and the second media asset 210) using Equation 2 described above (and reproduced here for convenience).

$$\text{Views}_{i,j} = C_i * m_{i,j} \qquad \text{Equation 2:}$$

In Equation 2 above, the variable ($\text{Views}_{i,j}$) represents the predicted viewership information for the particular media asset of interest, the variable ($C_i$) represents the exposure predictor for the respective media asset and the variable ($m_{i,j}$) represents the social media activity count for the media asset of interest. With reference to the example of FIG. 2, solving for the viewership information for the media assets of interest using Equation 2, the viewership estimator 350 predicts the views for the fourth episode of the first media asset 205 ($\text{Views}_{1,4}$) is 128,466 (e.g., 203.9*630), and calculates the views for the fourth episode of the second media asset 210 ($\text{Views}_{2,4}$) is 135,767 (e.g., 179.6*756). The calculated viewership information may then be included in the report 155 provided to a requesting party.

Although the above examples refer to episode numbers, it is noted that the viewership information for each episode is representative of an experience. For example, the fourth episode of the first media asset 205 may also be referred to as the third "experience" for the first media asset 205. The equations and techniques described above in connection with FIG. 3 remain valid whether the variable (j) represents the episode number (e.g., j=4) or the experience number (e.g., j=3).

Figure 4:
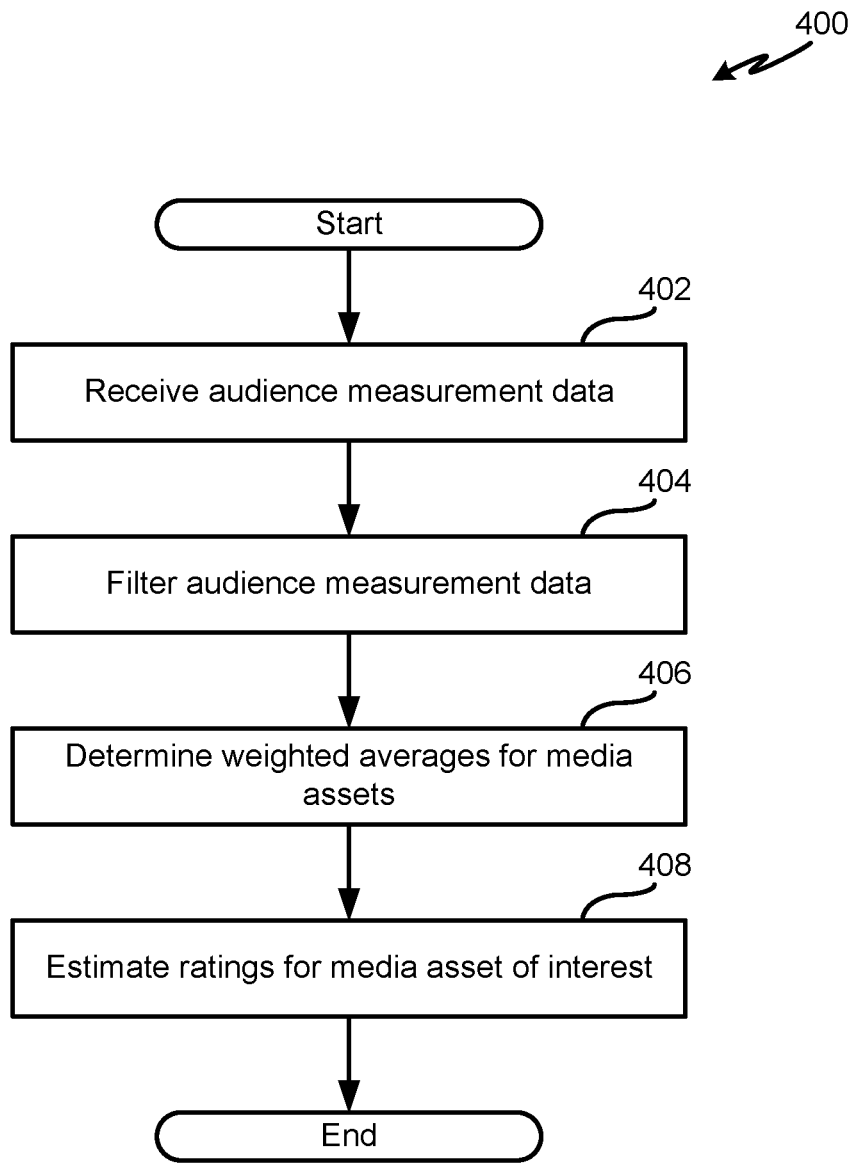
FIG. 4 is a flowchart representative of example machine-readable instructions that may be executed by the example central facility of FIG. 1 to estimate ratings for media assets using social media.

While an example manner of implementing the central facility 125 of FIG. 1 is illustrated in FIG. 1, one or more of the elements, processes and/or devices illustrated in FIG. 4 may be combined, divided, re-arranged, omitted, eliminated and/or implemented in any other way. Further, the example data interface 130, the example raw data database 135, the example data filterer 140, the example filtered data database 145, the example media ratings estimator 150 and/or, more generally, the example central facility 125 of FIG. 1 may be implemented by hardware, software, firmware and/or any combination of hardware, software and/or firmware. Thus, for example, any of the example data interface 130, the example raw data database 135, the example data filterer 140, the example filtered data database 145, the example media ratings estimator 150 and/or, more generally, the example central facility 125 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface 130, the example raw data database 135, the example data filterer 140, the example filtered data database 145, the example media ratings estimator 150 and/or, more generally, the example central facility 125 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example central facility 125 of FIG. 1 may include one or more elements, processes and/or devices in addition to, or instead of, those illustrated in FIG. 1, and/or may include more than one of any or all of the illustrated elements, processes and devices.

While an example manner of implementing the media ratings estimator 150 of FIG. 1 is illustrated in FIG. 3, one or more of the elements, processes and/or devices illustrated in FIG. 3 may be combined, divided, re-arranged, omitted, eliminated and/or implemented in any other way. Further, the example media selector 305, the example views aggregator 310, the example activity aggregator 315, the example averages calculator 320, the example expected value calculator 325, the example variance calculator 330, the example media credibility factor calculator 335, the example unbiased average calculator 340, the example weighted average calculator 345, the example viewership estimator 350 and/or, more generally, the example media ratings estimator 150 of FIG. 3 may be implemented by hardware, software, firmware and/or any combination of hardware, software and/or firmware. Thus, for example, any of the example media selector 305, the example views aggregator 310, the example activity aggregator 315, the example averages calculator 320, the example expected value calculator 325, the example variance calculator 330, the example media credibility factor calculator 335, the example unbiased average calculator 340, the example weighted average calculator 345, the example viewership estimator 350 and/or, more generally, the example media ratings estimator 150 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media selector 305, the example views aggregator 310, the example activity aggregator 315, the example averages calculator 320, the example expected value calculator 325, the example variance calculator 330, the example media credibility factor calculator 335, the example unbiased average calculator 340, the example weighted average calculator 345, the example viewership estimator 350 and/or, more generally, the example media ratings estimator 150 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example media ratings estimator 150 of FIG. 1 may include one or more elements, processes and/or devices in addition to, or instead of, those illustrated in FIG. 3, and/or may include more than one of any or all of the illustrated elements, processes and devices.

Flowcharts representative of example machine readable instructions for implementing the example central facility 125 of FIG. 1 are shown in FIGS. 4 and/or 5. In these examples, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4 and/or 5, many other methods of implementing the example central facility 125 may alternatively be used. For example, the order of execution of the blocks may be changed, and/or some of the blocks described may be changed, eliminated, or combined.

As mentioned above, the example processes of FIGS. 4 and/or 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4 and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. "Comprising" and all other variants of "comprise" are expressly defined to be open-ended terms. "Including" and all other variants of "include" are also defined to be open-ended terms. In contrast, the term "consisting" and/or other forms of "consist" are defined to be close-ended terms.

FIG. 4 is a flowchart representative of example machine-readable instructions 400 that may be executed by the example central facility 125 of FIG. 1 to estimate ratings for media using social media. The example instructions 400 of FIG. 4 begin at block 402 when the example central facility 125 receives audience measurement data 110 from the example audience measurement system(s) 105 of FIG. 1. For example, the example data interface 130 (FIG. 1) may periodically obtain and/or retrieve example panelist media measurement data 110A and/or example social media activity data 110B. In some examples, the data interface 130 may obtain and/or retrieve the example audience measurement data 110 aperiodically and/or as a one-time event. The example data interface 130 stores the audience measurement data 110 in the example raw data database 135 (FIG. 1).

At block 404, the example central facility 125 filters the audience measurement data 110. For example, the example data filterer 140 (FIG. 1) may generate data tables identifying viewership information and social media activity for media assets by parsing the raw data database 135 and aggregating viewership information and/or social media activity for past telecasts of media. In some examples, the data filterer 140 may translate the audience measurement data 110 received from the example audience measurement systems 105 prior to generating the data tables. The example data filterer 140 stores the generated data tables in the filtered data database 145 (FIG. 1).

At block 406, the example central facility 125 determines weighted averages for media assets of interest. For example, the media ratings estimator 150 (FIG. 1) calculates credibility factors for one or more media assets ($\hat{Z}_i$) and uses the credibility factors to determine the exposure predictors for the respective media assets ($C_i$). An example approach to determining the weighted averages is described below in connection with FIG. 5.

At block 408, the example central facility 125 estimates ratings for a media asset of interest. For example, the example media ratings estimator 150 may apply data related to the media asset of interest (e.g., a social media activity account for the media asset of interest ($m_{i,j}$)) to the exposure predictors for the corresponding media asset ($C_i$) to estimate ratings for the media asset ($Views_{i,j}$). The example process 400 of FIG. 4 ends.

While in the illustrated example, the example instructions 400 of FIG. 4 represent a single iteration of estimating ratings for media using social media, in practice, the example instructions 400 of the illustrated example of FIG. 4 may be executed in parallel (e.g., in separate threads) to allow the central facility 125 to handle multiple requests for ratings estimations at a time.

Figure 5:
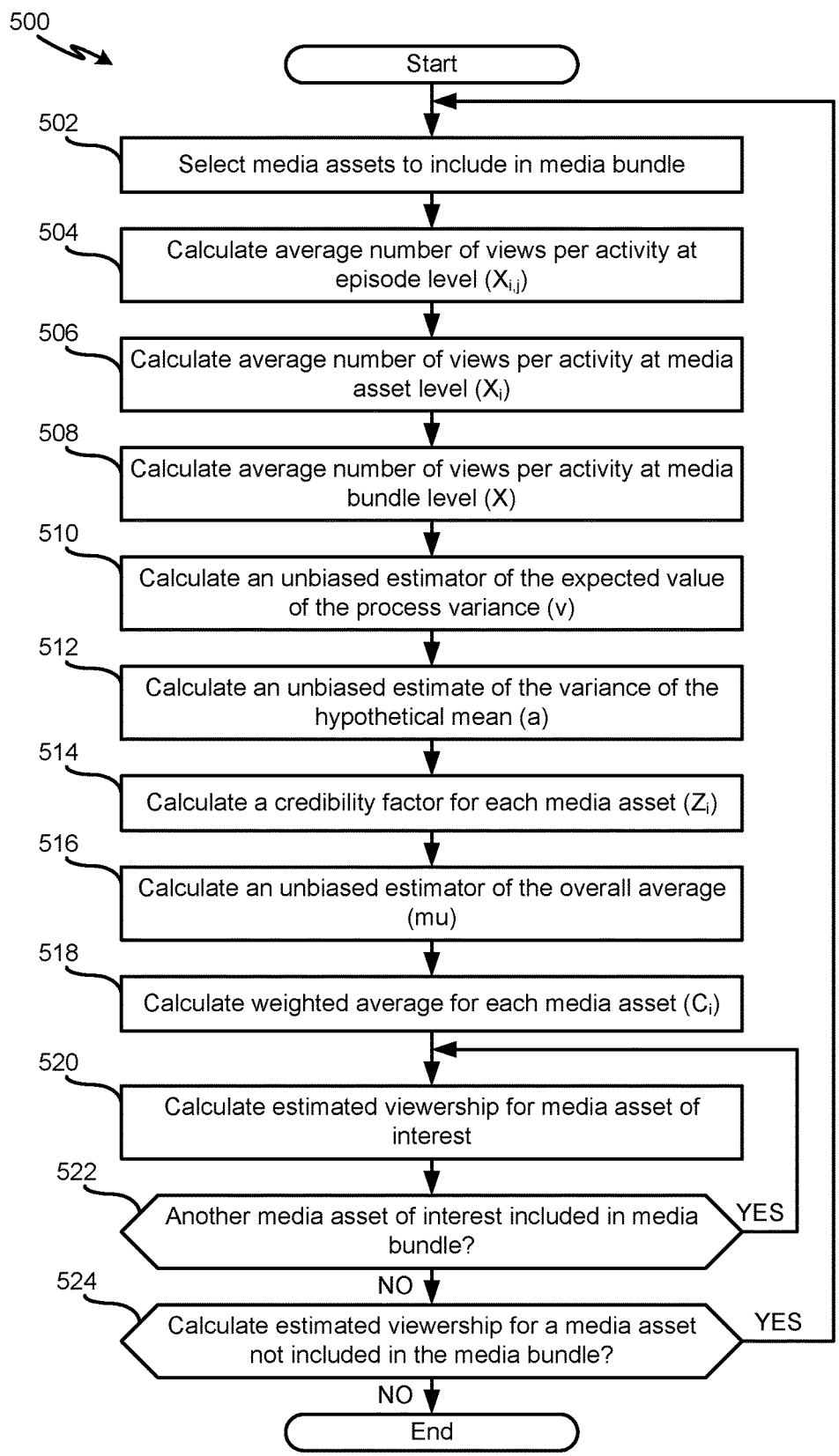
FIG. 5 is a flowchart representative of example machine-readable instructions that may be executed by the example media ratings estimator of FIGS. 1 and/or 3 to determine weighted averages for media assets.

FIG. 5 is a flowchart representative of example machine-readable instructions 500 that may be executed by the example media ratings estimator 150 of FIGS. 1 and/or 3 to determine weighted averages for media assets. The example process 500 of the illustrated example of FIG. 5 begins at block 502 when the example media selector 305 (FIG. 3) selects media to include in a media bundle. For example, the media selector 305 may use program attributes information of media assets included in the raw data database 135 (FIG. 1) and/or the filtered data database 145 (FIG. 1) to select two or more media assets to include in a media bundle. In some examples, the media selector 305 selects media assets that are associated with similar audiences (e.g., that have similar audience demographics).

At block 504, the media ratings estimator 150 calculates an average number of views per social media activity at the episode level ($\overline{X}_{i,j}$) for each of the media assets included in the media bundle. For example, the example averages calculator 320 (FIG. 3) may use Equation 3 to calculate the average number of views per social media activity count for each episode of the media assets in the media bundle. In some examples, the averages calculator 320 may retrieve aggregated viewership information at the episode level ($Views_{i,j}$) from the example views aggregator 310 (FIG. 3) and aggregated social media activity counts at the episode level ($m_{i,j}$) from the example activity aggregator 315 (FIG. 3).

At block 506, the media ratings estimator 150 calculates an average number of views per social media activity at the media asset level ($\overline{X}_i$). For example, the example averages calculator 320 may use Equation 4 to calculate the average number of views per social media activity count for each of the media assets in the media bundle. In some examples, the averages calculator 320 may retrieve aggregated viewership information at the media asset level ($Views_i$) from the example views aggregator 310 and aggregated social media activity counts at the media asset level ($m_i$) from the example activity aggregator 315.

At block 508, the media ratings estimator 150 calculates an average number of views per social media activity at the media bundle level ($\overline{X}$). For example, the example averages calculator 320 may use Equation 5 to calculate the average number of views per social media activity count for all of the media assets in the media bundle. In some examples, the averages calculator 320 may retrieve aggregated viewership information at the media bundle level (Views) from the example views aggregator 310 and aggregated social media activity counts at the media bundle level (m) from the example activity aggregator 315.

At block 510, the media ratings estimator 150 calculates an unbiased estimator of the expected value of the process variance ($\hat{v}$). For example, the example expected value calculator 325 (FIG. 3) may use Equation 6 to calculate the unbiased estimate of an expected value of the process variance ($\hat{v}$). In some examples, the expected value calculator 325 retrieves the aggregated social media activity counts at the episode level ($m_{i,j}$) from the activity aggregator 315. The example expected value calculator 325 may retrieve the average number of views per social media activity at the episode level ($\overline{X}_{i,j}$) and the average number of views per social media activity at the media asset level ($\overline{X}_i$) from the example averages calculator 320.

At block 512, the media ratings estimator 150 calculates an unbiased estimate of a variance of the hypothetical mean ($\hat{a}$). For example, the example variance calculator 330 (FIG. 3) may use Equation 7 to calculate the unbiased estimate of a variance of the hypothetical mean ($\hat{a}$). In some examples, the variance calculator 330 retrieves the social media activity count associated with the respective media asset ($m_i$) from the from the activity aggregator 315. The example variance calculator 330 may retrieve the average number of views per social media activity at the media asset level ($\overline{X}_i$) and the average number of views per social media activity count at the media bundle level ($\overline{X}$) from the example averages calculator 320.

At block 514, the example media ratings estimator 150 calculates a credibility factor for each media asset in the media bundle ($\hat{Z}_i$). For example, the example media credibility factor calculator 335 (FIG. 3) may use Equation 8 to calculate the credibility factor for each media asset in the media bundle ($\hat{Z}_i$). In some examples, the variance calculator 330 retrieves the social media activity count associated with the respective media asset ($m_i$) from the from the activity aggregator 315. The example media credibility factor calculator 335 retrieves the unbiased estimate of an expected value of the process variance ($\hat{v}$) from the example expected value calculator 325 and retrieves the unbiased estimate of a variance of the hypothetical mean ($\hat{a}$) from the example variance calculator 330.

At block 516, the example media ratings estimator 150 calculates an unbiased estimator of the overall average number of views per social media activity count over all media assets in the media bundle ($\hat{\mu}$). For example, the example unbiased average calculator 340 (FIG. 3) may use Equation 9 to calculate the unbiased estimator of the overall average ($\hat{\mu}$). In some examples, the unbiased average calculator 340 retrieves the credibility factor for each media asset in the media bundle ($\hat{Z}_i$) from the example media credibility factor calculator 335 and the average number of views per social media activity count at the media asset level ($\overline{X}_i$) from the example averages calculator 320.

At block 518, the example media ratings estimator 150 calculates the exposure predictor at the media asset level ($C_i$) (e.g., the weighted average number of views per social media activity). For example, the weighted average calculator 345 (FIG. 3) may use Equation 1 to calculate the exposure predictor at the media asset level ($C_i$). In some examples, the weighted average calculator 345 retrieves the credibility factor of a media asset ($\hat{Z}_i$) from the example media credibility factor calculator 335, retrieves the average number of views per social media activity count of the media asset ($\overline{X}_i$) from the examples averages calculator 320, and retrieves the unbiased estimator of the overall average ($\hat{\mu}$) from the example unbiased average calculator 340.

At block 520, the example media ratings estimator 150 calculates the estimated viewership for the media asset of interest using social media ($Views_{i,j}$). For example, the example viewership estimator 350 (FIG. 3) uses Equation 2 to calculate the estimated viewership for the media asset of interest ($Views_{i,j}$). In some examples, the viewership estimator 350 retrieves the exposure predictor at the media asset level ($C_i$) from the example weighted average calculator 345 and the example social media activity count for the media asset of interest ($m_{i,j}$) from the example activity aggregator 315.

At block 522, the example media ratings estimator 150 determines whether the media bundle includes another media asset of interest. If, at block 522, the media ratings estimator 150 determines that the media bundle does include another media asset of interest, then control returns to block 520 to calculate the estimated viewership for the media asset of interest. If, at block 522, the media ratings estimator 150 determines that the media bundle does not include another media asset of interest, then, at block 524, the example media ratings estimator 150 determines whether to calculate an estimated viewership for a media asset not included in the media bundle. For example, the media ratings estimator 150 may parse the example raw data database 135 and/or the example filtered data database 145 to determine if there is another media asset of interest.

If, at block 524, the media ratings estimator 150 determines to calculate estimated viewership information for a media asset not included in the media bundle, then control returns to block 502 to select media assets to include in a new media bundle. Otherwise, if, at block 524, the media ratings estimator 150 determines not to calculate estimated viewership information for another media asset, the example process 500 of FIG. 5 ends.

Figure 6:
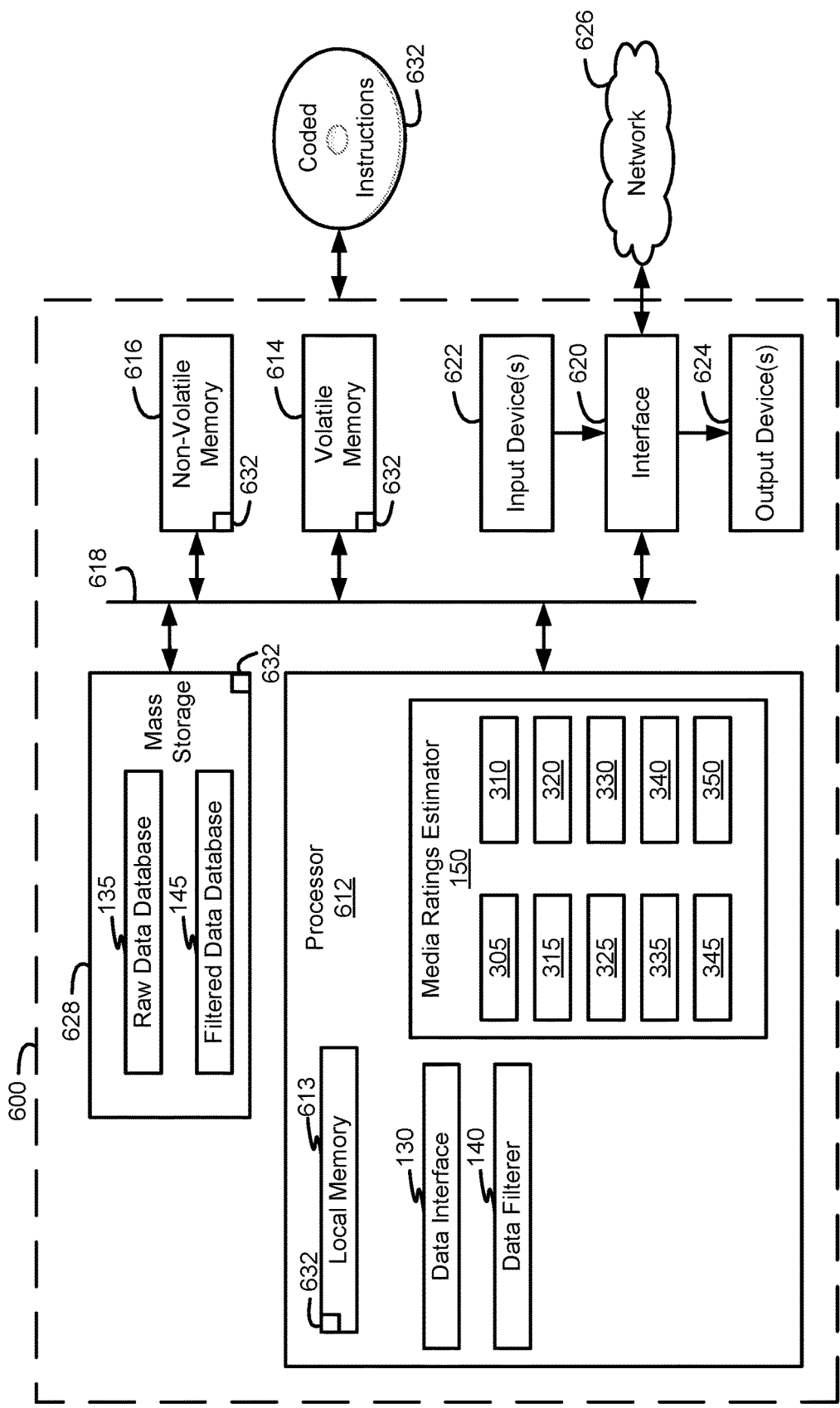
FIG. 6 is a block diagram of an example processing platform structured to execute the example machine-readable instructions of FIGS. 4 and/or 5 to implement the example central facility and/or the example media ratings estimator of FIGS. 1 and/or 3.

FIG. 6 is a block diagram of an example processor platform 600 capable of executing the instructions of FIGS. 4 and/or 5 to implement the example central facility 125 of FIG. 1 and/or the example media ratings estimator 150 of FIGS. 1 and/or 3. The processor platform 600 can be, for example, any type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example executes the instructions to implement the example data interface 130, the example data filterer 140, the example media ratings estimator 150, the example media selector 305, the example views aggregator 310, the example activity aggregator 315, the example averages calculator 320, the example expected value calculator 325, the example variance calculator 330, the example media credibility factor calculator 335, the example unbiased average calculator 340, the example weighed average calculator 345 and the example viewership estimator 350. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a peripheral component interconnect (PCI) express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives. The example mass storage 628 implements the example raw data database 135 and the example filtered data database 145.

The coded instructions 632 of FIGS. 4 and/or 5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods, apparatus and articles of manufacture facilitate estimating ratings for media using social media. For example, disclosed examples enable extrapolating viewership information for a media asset of interest based on social media activity. Examples disclosed herein use historical data (e.g., "experiences") of different media assets having similar audiences to determine weighted averages for the respective media assets. The weighted averages for the respective media assets represent unbiased average exposure per social media activity counts at the media asset level. The weighted averages may then be used to calculate viewership information at the episode level for the media assets.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to estimate ratings for a first media asset, the method comprising:
   accessing, by executing an instruction with a processor, media exposure data and social media activity data corresponding to a plurality of media assets in a media bundle, the media assets included in the media bundle having audience demographics that overlap with the first media asset;

determining, by executing an instruction with the processor, a first credibility factor for the first media asset and average exposure for social media activity count values for respective ones of the media assets in the media bundle based on the media exposure data and the social media activity data;

applying, by executing an instruction with the processor, the first credibility factor to an average exposure per social media activity count value determined for the first media asset to estimate the ratings for the first media asset;

wherein the determining of the average exposure for the media assets in the media bundle includes:
  calculating an average number of views per social media activity count at a media asset level for respective ones of the media assets included in the media bundle; and
  calculating an average number of views per social media activity count at a media bundle level;
calculating an unbiased estimator of an expected value based on a ratio of (1) social media activity counts at the episode level, the average number of views per social media activity count at the episode level, and the average number of views per social media activity count at the media asset level, and (2) a number of episodes of the media bundle associated with historical viewership information and social media activity counts; and
calculating an unbiased estimator of an expected variance based on a ratio of (1) social media activity counts at the media asset level, the average number of views per social media activity count at the media asset level, the average number of views per social media activity count at the media bundle level and the unbiased estimator of the expected value, and (2) social media activity counts at the media asset level and social media activity counts at the media bundle level.

2. The method as defined in claim 1, further including calculating the first credibility factor for the first media asset based on the social media activity count at the media asset level, the unbiased estimator of the expected variance and the unbiased estimator of the expected value.

3. The method as defined in claim 1, further including selecting the media assets to include in the media bundle based on an audience of the first media asset.

4. The method as defined in claim 1, wherein the determining of the average exposure for the media assets in the media bundle includes:
  calculating the average number of views per social media activity count at the episode level for respective ones of the media assets included in the media bundle;
  calculating the average number of views per social media activity count at the media asset level for respective ones of the media assets included in the media bundle; and
  calculating an average number of views per social media activity count at a media bundle level.

5. The method as defined in claim 4, wherein the calculating of the average number of views per social media activity count at the episode level includes determining a ratio of viewership information for a first episode of the first media asset and a social media activity count associated with the first episode.

6. The method as defined in claim 4, wherein the calculating of the average number of views per social media activity count at the media asset level includes:
  identifying episodes of the first media asset associated with historical viewership information and a social media activity count; and
  aggregating viewership information for the identified episodes;
aggregating social media activity counts for the identified episodes; and
determining a ratio of the aggregated viewership information and the aggregated social media activity counts.

7. An apparatus to estimate ratings for a first media asset, the apparatus comprising:
  a data filterer to access media exposure data and social media activity data corresponding to a plurality of respective media assets in a media bundle, the media assets included in the media bundle having audience demographics that overlap with the first media asset; and
  a media ratings estimator to:
  determine a first credibility factor for the first media asset and average exposure for social media activity count values for respective ones of the media assets in the media bundle based on the media exposure data and the social media activity data; and
  apply the first credibility factor to an average exposure per social media activity count value determined for the first media asset to estimate the ratings for the first media asset;
  an averages calculator to:
    calculate an average number of views per social media activity count at an episode level for respective ones of the media assets included in the media bundle;
  calculate an average number of views per social media activity count at a media asset level for respective ones of the media assets included in the media bundle; and
    calculate an average number of views per social media activity count at a media bundle level;
  an expected value calculator to calculate an unbiased estimator of an expected value based on a ratio of (1) social media activity counts at the episode level, the average number of views per social media activity count at the episode level, and the average number of views per social media activity count at the media asset level, and (2) a number of episodes of the media bundle associated with historical viewership information and social media activity counts; and
  a variance calculator to calculate an unbiased estimator of an expected variance based on a ratio of (1) social media activity counts at the media asset level, the average number of views per social media activity count at the media asset level, the average number of views per social media activity count at the media bundle level and the unbiased estimator of the expected value, and (2) social media activity counts at the media asset level and social media activity counts at the media bundle level.

8. The apparatus as defined in claim 7, further including a media credibility factor calculator to calculate the first credibility factor for the first media asset based on the social media activity count at the media asset level, the unbiased estimator of the expected variance and the unbiased estimator of the expected value.

9. The apparatus as defined in claim 7, further including a media selector to select the media assets to include in the media bundle based on an audience of the first media asset.

10. The apparatus as defined in claim 7, wherein the averages calculator is to calculate the average number of views per social media activity count at the episode level by determining a ratio of viewership information for a first episode of the first media asset and a social media activity count associated with the first episode.

11. The apparatus as defined in claim 7, wherein the averages calculator is to calculate the average number of views per social media activity count at the media asset level by:
   identifying episodes of the first media asset associated with historical viewership information and a social media activity count;
   aggregating viewership information for the identified episodes;
   aggregating social media activity counts for the identified episodes; and
   determining a ratio of the aggregated viewership information and the aggregated social media activity counts.

12. A tangible machine-readable storage medium comprising instructions that, when executed, cause a processor to at least:
   access media exposure data and social media activity data corresponding to a plurality of respective media assets in a media bundle, the media assets included in the media bundle having audience demographics that overlap with a first media asset;
   determine a first credibility factor for the first media asset and average exposure for social media activity count values for respective ones of the media assets in the media bundle based on the media exposure data and the social media activity data;
   apply the first credibility factor to an average exposure per social media activity count value determined for the first media asset to estimate ratings for the first media asset;
   calculate an average number of views per social media activity count at an episode level for respective ones of the media assets included in the media bundle;
   calculate an average number of views per social media activity count at a media asset level for respective ones of the media assets included in the media bundle;
   calculate an average number of views per social media activity count at a media bundle level;
   calculate an unbiased estimator of an expected value based on a ratio of (1) social media activity counts at the episode level, the average number of views per social media activity count at the episode level, and the average number of views per social media activity count at the media asset level, and (2) a number of episodes of the media bundle associated with historical viewership information and social media activity counts; and
   calculate an unbiased estimator of an expected variance based on a ratio of (1) social media activity counts at the media asset level, the average number of views per social media activity count at the media asset level, the average number of views per social media activity count at the media bundle level and the unbiased estimator of the expected value, and (2) social media activity counts at the media asset level and social media activity counts at the media bundle level.

13. The tangible machine-readable storage medium as defined in claim 12, wherein the instructions are to further cause the processor to calculate the first credibility factor for the first media asset based on the social media activity count at the media asset level, the unbiased estimator of the expected variance and the unbiased estimator of the expected value.

14. The tangible machine-readable storage medium as defined in claim 12, wherein the instructions are to further cause the processor to select the media assets to include in the media bundle based on an audience of the first media asset.

15. The tangible machine-readable storage medium as defined in claim 12, wherein the instructions are to further cause the processor to calculate the average number of views per social media activity count at the episode level by determining a ratio of viewership information for a first episode of the first media asset and a social media activity count associated with the first episode.

16. The tangible machine-readable storage medium as defined in claim 12, wherein the instructions are to further cause the processor to calculate the average number of views per social media activity count at the media asset level by:
   identifying episodes of the first media asset associated with historical viewership information and a social media activity count;
   aggregating viewership information for the identified episodes;

aggregating social media activity counts for the identified episodes; and determining a ratio of the aggregated viewership information and the aggregated social media activity counts.

* * * * *